United States Patent [19]
Li

[11] Patent Number: 6,105,460
[45] Date of Patent: Aug. 22, 2000

[54] HANDGRIP ADAPTED TO BE SLEEVED ON A TUBULAR END OF A HANDLEBAR OF A BICYCLE

[76] Inventor: Cheng-Tao Li, No. 323, Chung-Hwa Rd., Nantou Hsien, Taiwan

[21] Appl. No.: 09/294,711

[22] Filed: Apr. 19, 1999

[51] Int. Cl.[7] .................... B62K 21/26; B25B 23/16
[52] U.S. Cl. .................... 74/551.9; D8/107; 81/177.1; 16/110 R
[58] Field of Search .................... 74/551.8, 558, 74/558.5, 551.9; D8/107, 303, 83, 82; 81/177.1, 436, 437, 438, 439, 440; 16/110 R, DIG. 19, DIG. 12

[56] References Cited

U.S. PATENT DOCUMENTS

| | | | |
|---|---|---|---|
| D. 411,428 | 6/1999 | Scott | D8/107 |
| D. 411,432 | 6/1999 | Stahel | D8/303 |
| D. 414,095 | 9/1999 | Hoepfl et al. | D8/83 |
| D. 416,776 | 11/1999 | Liu | D8/83 |
| D. 420,888 | 2/2000 | Yu | D8/107 |
| 2,776,579 | 1/1957 | Nichel | 74/488 |
| 3,713,350 | 1/1973 | Brilando | 74/551.9 |
| 4,837,892 | 6/1989 | Lo | 16/116 R |
| 5,454,580 | 10/1995 | Lin | 280/291 |
| 5,590,432 | 1/1997 | Taskey | 7/108 |
| 5,740,586 | 4/1998 | Gomas | 16/111 R |
| 5,823,069 | 10/1998 | Roark et al. | 74/551.9 |
| 5,887,306 | 3/1999 | Huang | 7/165 |
| 5,957,014 | 9/1999 | Tseng et al. | 81/439 |
| 6,006,625 | 12/1999 | Nagashima | 74/551.9 X |
| 6,029,549 | 2/2000 | Baker | 81/439 |

FOREIGN PATENT DOCUMENTS

| | | |
|---|---|---|
| 29907254 U1 | 9/1999 | Germany . |
| 171002 | 11/1921 | United Kingdom . |

*Primary Examiner*—Vinh T. Luong
*Attorney, Agent, or Firm*—Harness, Dickey & Pierce, P.L.C.

[57] ABSTRACT

A handgrip is adapted to be sleeved on a tubular end of a handlebar of a bicycle, and includes a plastic elongated molded grip body. The grip body has an outer circumferential wall with a metacarpal portion and a proximate phalangeal portion respectively corresponding to anatomically contact areas of a human hand when the hand grips the grip body. The metacarpal portion has a cutout portion proximate to the proximate phalangeal portion. The cutout portion is elongated in the axial direction, and extends radially to communicate with an inner circumferential wall of the grip body. An annular shoulder portion is disposed inwardly from the cutout portion and radially toward the outer circumferential wall so as to define an annular insertion groove. A hollow flexible pad member includes a pad body which is inserted retainingly into the cutout portion. The pad body has an upper portion protruding outwardly of the outer circumferential wall to provide comfort to the metacarpal portion of the hand. An annular flange portion extends outwardly and circumferentially from the pad body, and is inserted the groove to hinder removal of the pad member from the grip body.

6 Claims, 4 Drawing Sheets

HANDGRIP ADAPTED TO BE SLEEVED ON A TUBULAR END OF A HANDLEBAR OF A BICYCLE

BACKGROUND OF THE INVENTION

1. Field of the Invention

This invention relates to a handgrip adapted to be sleeved on a tubular end of a handlebar of a bicycle, more particularly to a handgrip with a flexible pad member to provide comfort to a human hand.

2. Description of the Related Art

A conventional handgrip is sleeved on a tubular end of a handlebar of a bicycle and is adapted for gripping by the hand of the user. Since the conventional handgrip is made of a rigid plastic material, a satisfactory feeling of comfort cannot be obtained when the user grips the handgrip.

SUMMARY OF THE INVENTION

The object of the present invention is to provide a handgrip which can provide a satisfactory feeling of comfort to anatomically contact areas of a human hand.

According to this invention, the handgrip includes a molded grip body which is made of a plastic material and which is elongated in an axial direction. The molded grip body includes an outer circumferential wall and an inner circumferential wall which defines an axial hole adapted for sleeving the grip body on a tubular end of a bicycle handlebar. The outer circumferential wall includes a metacarpal portion and a proximal phalangeal portion respectively corresponding to anatomically contact areas of a human hand when the hand user grips the molded grip body. The metacarpal portion has a cutout portion proximate to the proximal phalangeal portion. The cutout portion is elongated in the axial direction, and extends radially to communicate with the inner circumferential wall. An inner peripheral portion of the inner circumferential wall has an annular shoulder portion which is disposed inwardly from the cutout portion and radially towards the outer circumferential wall so as to be adapted to define with the tubular end an annular insertion groove. A primary pad member is made of a material which is more flexible than the plastic material. The primary pad member includes a pad body which is inserted into the cutout portion and which retainingly fits with the inner peripheral portion. The pad body has an upper portion which extends uprightly from the periphery of the pad body so as to protrude radially and outwardly of the outer circumferential wall for providing comfort to the metacarpal portion of the hand. An annular flange portion extends outwardly and circumferentially from the periphery of the pad body, and is inserted into the annular groove to hinder removal of the primary pad member from the molded grip body along the radial direction.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
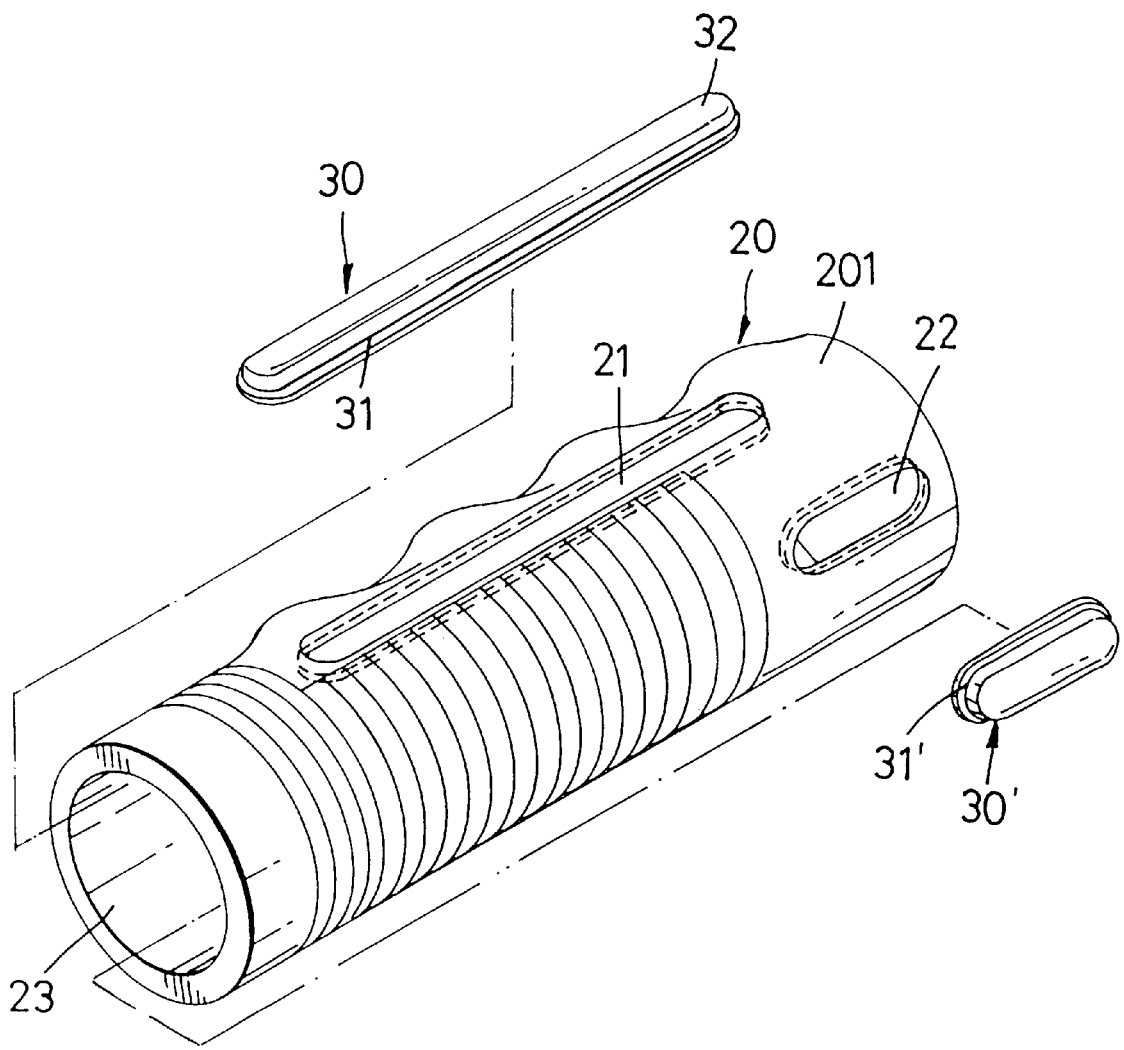
FIG. 1 is an exploded view of a preferred embodiment of a handgrip according to this invention.
Figure 2:
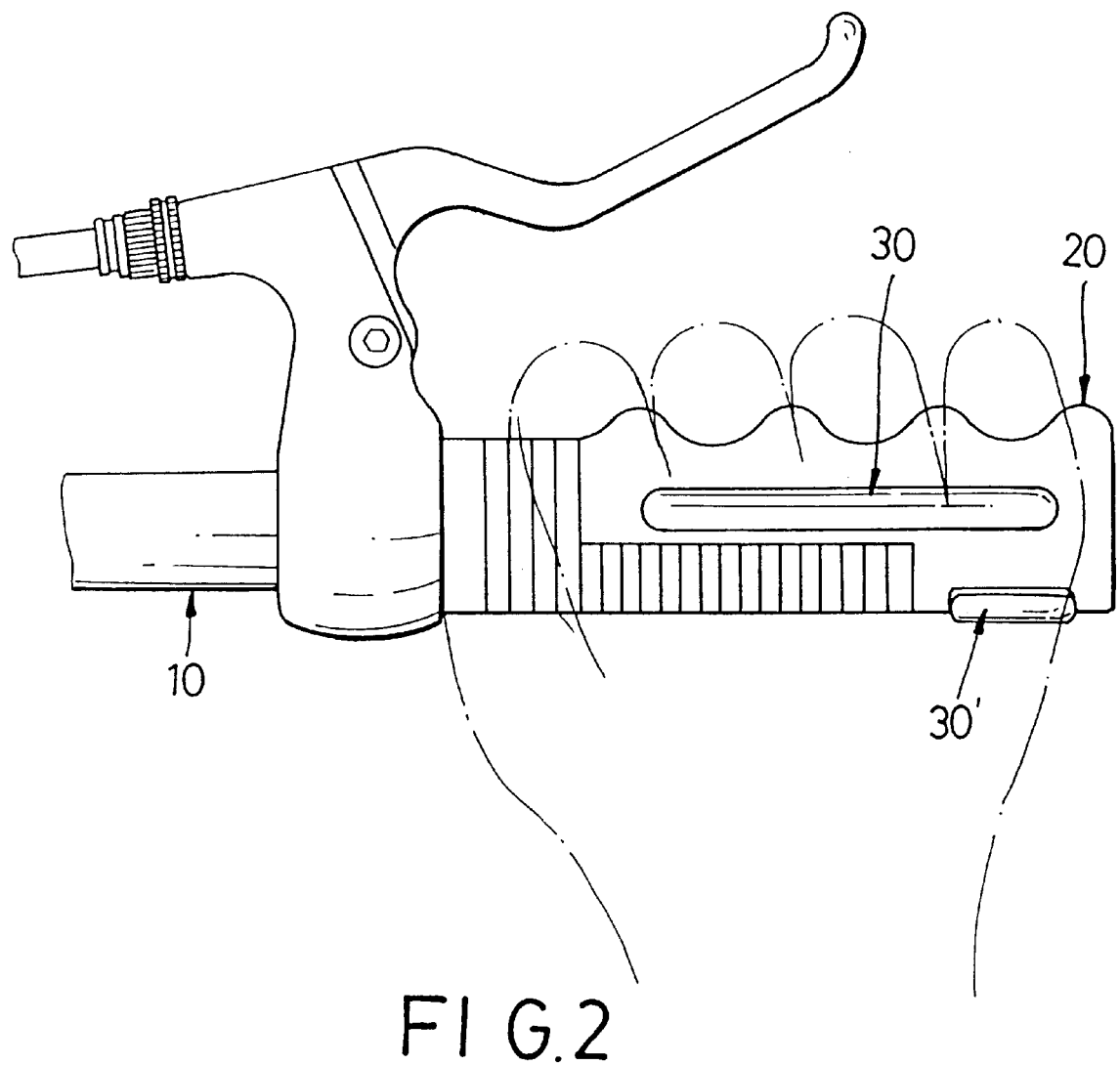
FIG. 2 is a side view of the preferred embodiment sleeved on a tubular end of a handlebar of a bicycle.
Figure 3:
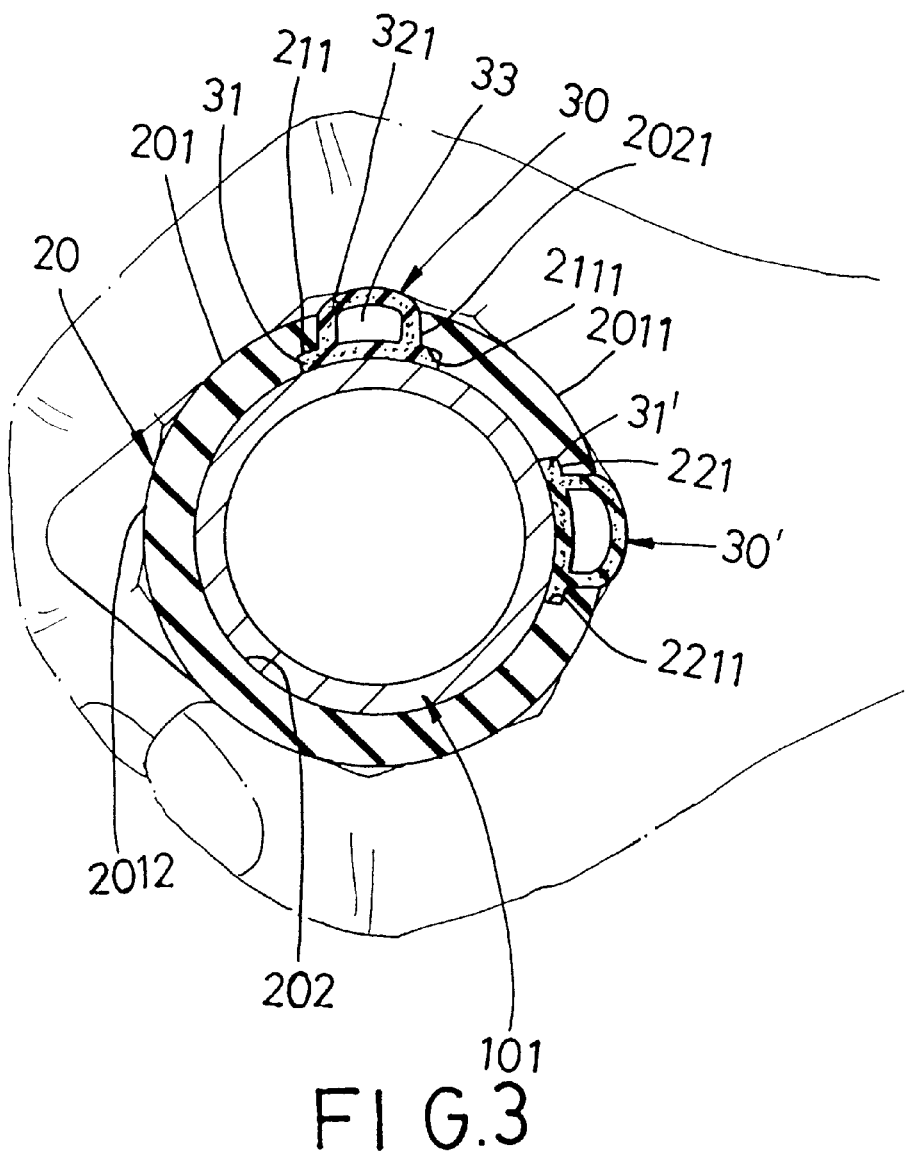
FIG. 3 is a sectional view of the preferred embodiment.

Referring to FIGS. 1, 2 and 3, the preferred embodiment of the handgrip according to the present invention is shown to comprise a molded grip body 20 which is made of a plastic material and which is elongated in an axial direction. The molded grip body 20 includes outer and inner circumferential walls 201, 202 opposite to each other in a radial direction. The inner circumferential wall 202 defines an axial hole 23 so as to be adapted to be sleeved non-rotatably on a tubular end 101 of a handlebar 10 of a bicycle around the axial direction. The outer circumferential wall 201 includes a metacarpal portion 2011 and a proximal phalangeal portion 2012 which respectively correspond to anatomically contact areas of a human hand when the user grips the molded grip body 20. The metacarpal portion 2011 defines a cutout portion 21 proximate to the proximal phalangeal portion 2012. The cutout portion 21 is elongated in the axial direction, and extends radially to communicate with the inner circumferential wall 202. The inner circumferential wall 202 has an inner peripheral portion 2021 to define the cutout portion 21. The inner peripheral portion 2021 further has an annular shoulder portion 211 which is disposed inwardly from the cutout portion 21 and radially towards the outer circumferential wall 201 so as to be adapted to define an annular insertion groove 2111 with the tubular end 101 of the handlebar A primary pad member 30 is made of a material which is more flexible than the plastic material, and which has an air chamber 33 formed therein. The primary pad member 30 includes a pad body 32 with a periphery which is elongated to mate with the cutout portion 21. The pad body 32 is inserted into the cutout portion 21 and is adhered retainingly to the inner peripheral portion 2021. Moreover, the pad body 32 has an upper portion 321 extending uprightly from the periphery thereof so as to protrude radially and outwardly of the outer circumferential wall 201 so as to provide comfort to the metacarpal portion of the hand, as shown in FIG. 3.

An annular flange portion 31 extends outwardly and circumferentially from the periphery of the pad body 32. The annular flange portion 31 is inserted into the annular groove 2111 and is retained therein through the use of an adhesive so as to hinder removal of the primary pad member 30 from the molded grip body 20 along the radial direction.

Preferably, the molded grip body 20 further has an auxiliary cutout portion 22 which is formed in the metacarpal portion 2011 distal to the proximal phalangeal portion 2012 to be located proximate to the little finger of the hand, and which is elongated in the axial direction. An annular shoulder portion 221 is disposed inwardly from the auxiliary cutout portion 22 and radially towards the outer circumferential wall 201 so as to define an annular insertion groove 2211. An auxiliary pad member 30' is made of the same material as the primary pad member 30, and has a construction similar to the pad member 30 such that an annular flange portion 31' thereof is inserted into the annular insertion groove 2211. As such, the auxiliary pad member 30' is disposed retainingly in the auxiliary cutout portion 22 in a manner similar to that described hereinabove.

By virtue of the pad members 30,30' which are disposed on the metacarpal portion 2011, the handgrip of this invention can provide a satisfactory feeling of comfort to the hand of the user when in use.

Figure 4:
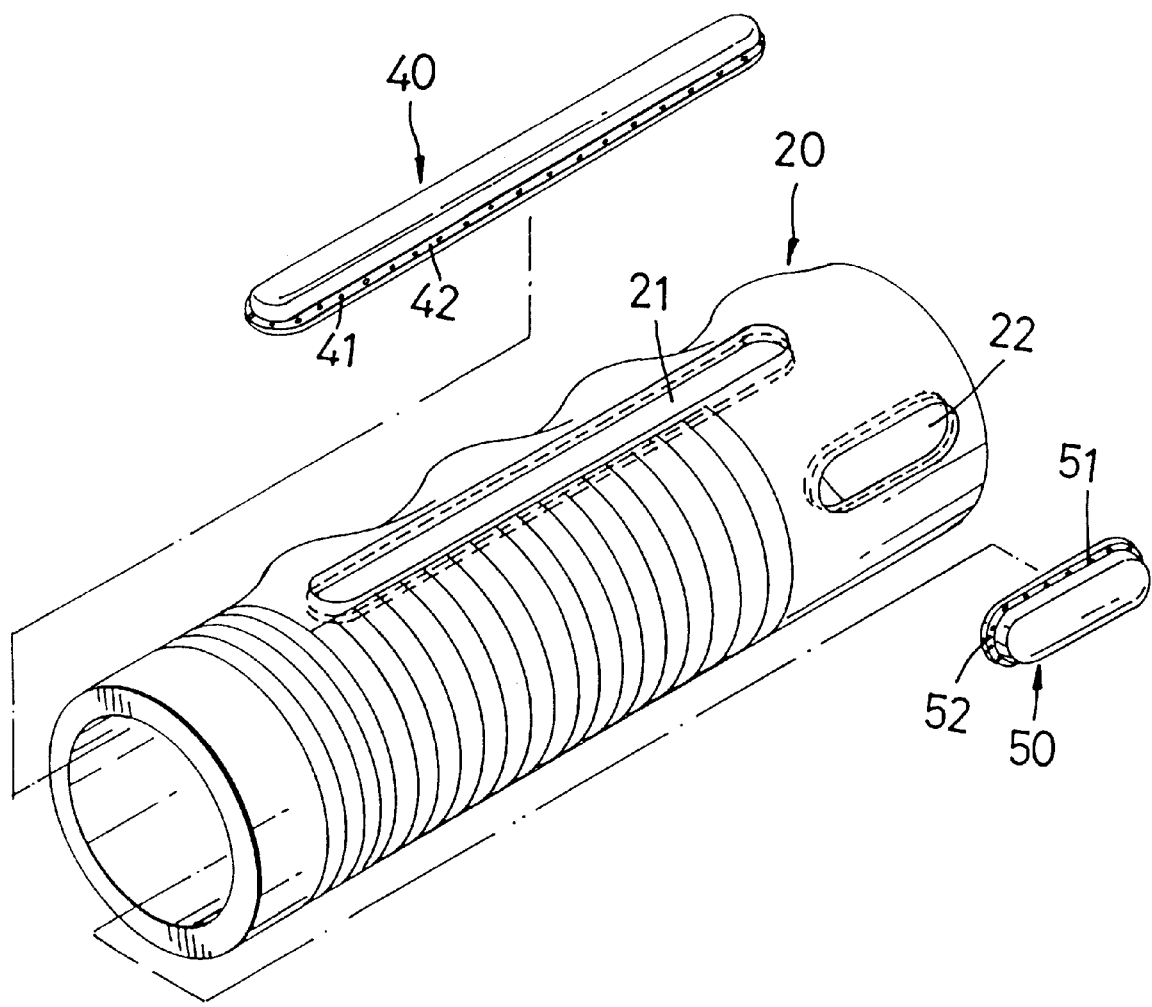
FIG. 4 is an exploded view of another preferred embodiment of the handgrip according to this invention.

Alternatively, referring to FIG. 4, another preferred embodiment of the handgrip according to this invention includes primary and auxiliary pad members 40,50, each of which has a series of through holes 41,51 that are formed around an annular flange portion 42, 52 thereof, thereby facilitating injection molding of the grip body 20 to retain the primary and auxiliary pad members 40,50 in the cutout portions 21,22.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A handgrip adapted to be sleeved on a tubular end of a handlebar of a bicycle, comprising:

a molded grip body made of a plastic material and elongated in an axial direction, said molded grip body including outer and inner circumferential walls opposite to each other in a radial direction, said inner circumferential wall defining an axial hole of such a dimension so as to be adapted to be sleeved non-rotatably on the tubular end around the axial direction, said outer circumferential wall including a metacarpal portion and a proximal phalangeal portion respectively corresponding to anatomically contact areas of a human hand when the hand grips said molded grip body, said metacarpal portion defining a cutout portion proximate to said proximal phalangeal portion, said cutout portion being elongated in the axial direction and extending radially to communicate with said inner circumferential wall, said inner circumferential wall including an inner peripheral portion to define said cutout portion, said inner peripheral portion including an annular shoulder portion disposed inwardly from said cutout portion and radially towards said outer circumferential wall so as to be adapted to define with the tubular end an annular insertion groove; and a primary pad member made of a material which is more flexible than said plastic material, said primary pad member including:

a pad body with a periphery which is elongated to mate with said cutout portion, said pad body being inserted into said cutout portion and retainingly fitting with said inner peripheral portion, said pad body having an upper portion extending uprightly from said periphery so as to protrude radially and outwardly of said outer circumferential wall for providing comfort to the metacarpal portion of the hand; and an annular flange portion extending outwardly and circumferentially from said periphery, and inserted into said annular groove to hinder removal of said primary pad member from said molded grip body along the radial direction.

2. The handgrip according to claim 1, wherein said primary pad member is adhered to said inner peripheral portion.

3. The handgrip according to claim 1, wherein said primary pad member has an air chamber formed therein.

4. The handgrip according to claim 1, wherein said molded grip body is formed by injection molding to retain said primary pad member in said cutout portion.

5. The handgrip according to claim 1, further comprising an auxiliary pad member made of the same material as said primary pad member, and disposed on said metacarpal portion distal to said proximal phalangeal portion and adapted to be located proximate to the little finger of the hand so as to provide comfort to the metacarpal portion of the hand.

6. The handgrip according to claim 5, wherein said auxiliary pad member has an air chamber formed therein.

* * * * *